United States Patent [19]

Yaniv

[11] Patent Number: 4,755,092
[45] Date of Patent: Jul. 5, 1988

[54] QUICK-ACTION FASTENER

[75] Inventor: Israel Yaniv, Karmiel, Israel

[73] Assignee: Galram Technology Industries Limited, Haifa, Israel

[21] Appl. No.: 775,022

[22] Filed: Sep. 11, 1985

[30] Foreign Application Priority Data

Sep. 14, 1984 [IL] Israel .......................................... 72940

[51] Int. Cl.4 ............................................ F16B 21/00
[52] U.S. Cl. ..................................... 411/554; 403/146;
403/408.1; 411/436; 411/918
[58] Field of Search ............... 411/554, 436, 437, 411,
411/308–311, 263, 259, 432, 433, 918, 417, 386,
349, 350, 907, 369; 403/146, 149, 408.1

[56] References Cited

U.S. PATENT DOCUMENTS

| 145,411 | 12/1873 | Frearson | 411/404 |
| 890,447 | 6/1908 | Perry | 411/411 |
| 1,368,117 | 2/1921 | Claude | 411/554 X |
| 1,782,463 | 11/1930 | Colantuono et al. | 411/918 X |
| 2,261,369 | 11/1941 | Henry et al. | 411/554 |
| 2,339,591 | 1/1944 | Weber | 411/554 |
| 2,358,005 | 9/1944 | Green | 411/554 |
| 2,391,761 | 12/1945 | Winn | 411/409 X |
| 2,396,005 | 3/1946 | Gross et al. | 411/369 X |
| 2,401,672 | 6/1946 | Tinnerman | 411/437 |
| 2,444,040 | 6/1948 | Gower | 411/350 X |
| 2,587,134 | 2/1952 | Flora | 411/259 |
| 2,915,152 | 12/1959 | Graham | 411/369 X |
| 3,183,531 | 5/1965 | McKewan | 411/411 X |
| 3,720,129 | 3/1973 | Lagasse | 411/402 |
| 3,877,341 | 4/1975 | Grimm et al. | 411/437 |
| 3,958,321 | 5/1976 | Schenk | 29/526 X |
| 4,431,354 | 2/1984 | Griffin | 411/411 X |

FOREIGN PATENT DOCUMENTS

| 0018809 | 11/1980 | European Pat. Off. | 411/554 |
| 2417665 | 10/1979 | France | 403/408 |
| 1225507 | 3/1971 | United Kingdom | 411/437 |

Primary Examiner—Lloyd A. Gall
Attorney, Agent, or Firm—Foley & Lardner, Schwartz, Jeffery, Schwaab, Mack, Blumenthal & Evans

[57] ABSTRACT

A quick-action fastener for connecting two plates (III) and (IV) with a resilient gasket (V) interposed therebetween, all three being perforated by a throughgoing hole, comprises a bolt (I) passing through this hole and engaging with a bore (24) in a socket (II) which is rigidly fastened to the plate (III). A helical groove (14) is cut into the end of the bolt, which has a lead angle not exceeding 15°, and which engages with a protrusion (42) inwardly projecting from the bore (24) of the socket. Friction between the protrusion (42) and the wall of the helical groove (14) is strong enough to hold the bolt in position and to clamp the two plates together, owing to the tension of the resilient gasket.

20 Claims, 3 Drawing Sheets

FIG. 11
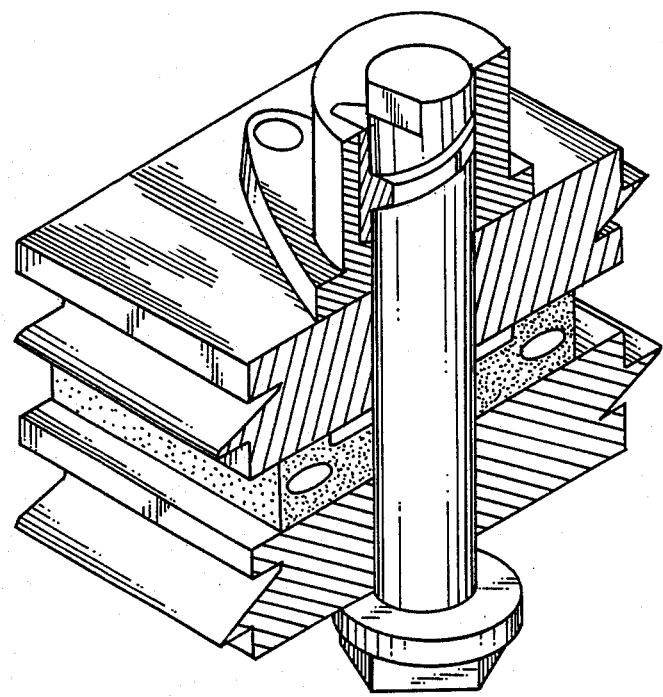
FIG. 12
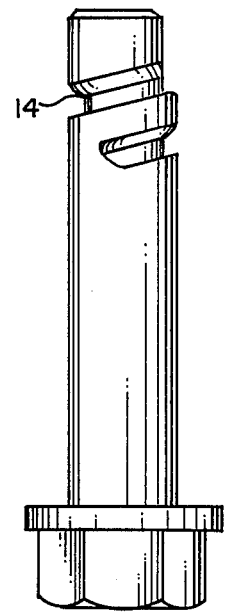
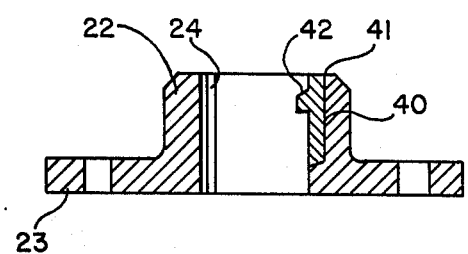
FIG. 13
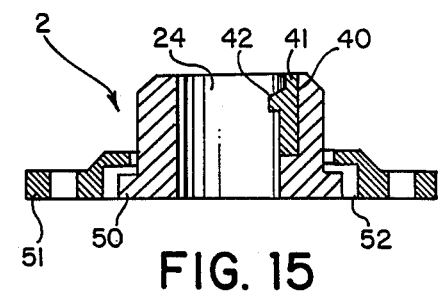
FIG. 15
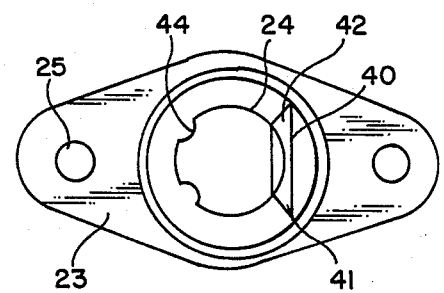
FIG. 14

QUICK-ACTION FASTENER

BACKGROUND OF THE INVENTION

The invention relates to a releasable fastener for connecting two solid bodies separated by a resilient body such as a gasket, through a hole continuously extending through the three bodies. It relates particularly to a quick-acting fastener especially suitable in places where only one side is readily accessible.

This kind of fasteners is required in all instances where two bodies are to be temporarily connected and separated, such as components of aircraft, in containers to be sealingly closed and to be opened frequently, or in the case of doors or windows which are to be tightly closed by means of gaskets and are to be readily opened. In all these cases bolts and nuts are not of much use, because their closure requires many turnings of a tool, and because their release is frequently hindered by dirt and rust accumulated in the threads. For this reason several quick-action fasteners have been devised, however most were found to be expensive and not reliable; mostly because they did not constitute a major improvement over bolts and nuts and were suffering from the same ailments.

SUMMARY OF THE INVENTION

It is, therefore, the main object of the present invention to provide a quick-action fastener that can be made available at low cost, and that will ensure quick closing and releasing. It is another object to permit blind fastening, i.e. operation from one side only while the other side is inaccessible. It is still another object to obtain variable closure force, which should remain firm even when the body is exposed to movements and vibrations. And as a final object the fastener should be so designed as to permit connecting bodies and gaskets of slightly varying thickness, by one and the same fastener.

The fastener according to the invention is adapted to connect the flat portions of two rigid bodies which have a resilient body, such as a gasket, interposed between the flat portions, the three bodies being perforated by a throughgoing hole. The fastener comprises two parts:

1. a bolt consisting of a shank of a generally uniform diameter adapted to pass through the hole in the bodies, and a head at the near end of the shaft adapted to be gripped for rotating the shank; a helical groove surrounds the far end of the shank by an angle of not less than 180°, with its lead angle not exceeding 15°.

2. a socket provided with means for being rigidly fastened to the outside of one of the solid bodies substantially concentric with the hole; the socket is perforated by a bore cooperating with the bolt, and a protrusion is provided in this bore of dimensions permitting its motion along said helical groove, while the bolt is rotated in the bore. The fastener is tensioned while contracting the solid bodies by forceful contact of the head of the bolt with the surface of the respective solid body, while the protrusion in the bore of the socket bears against the far side of the helical groove and remains there by friction force.

In a preferred embodiment of the bolt, the groove stops short of the far end of the shank, and a recess in the shank surface extends between the end of the groove and the end of the shank, this recess being substantially parallel to the axis of the shank. The depth of the recess is at least equal to the height of the protrusion in the bore so as to permit the passage of the protrusion along the recess into the groove.

The head of the bolt may be hexagonal, slotted or winged, or it may be recessed for the insertion of an Allen Key or a Phillips screw-driver.

In order to obtain an improved engagement of the protrusion in the socket bore with the helical groove of the bolt, the groove may be roughened in the shape of corrugations or in the shape of small spaced-apart knobs projecting out of the bottom of the groove.

The socket is preferably in the shape of a cylinder concentric with the bore and a flange provided with screw holes for attaching it to the surface of the rigid body by screws or rivets.

The protrusion may be provided in the shape of a pin radially inserted into the cylindrical portion and projecting into the bore by a distance not exceeding the depth of the helical groove as well as the depth of the recess in the bolt shank, measured from the shaft circumference.

In another embodiment of the socket the protrusion is in the shape of a pin transversely and eccentrically inserted into the cylindrical portion, whereby a portion of the pin surface projects into the bore by a distance not exceeding the depth of the groove.

The protrusion in the bore may likewise be created by deformation of the material by pressure from the outside, either in cold or in heated state.

The bolt is made of steel or another strong metal, while the socket may be made of metal, a sintered metal powder, a non-metallic composite material such as graphite reinforced by epoxy, or of any strong synthetic resin.

In the case the socket is fabricated from a sintered metal or a non-metallic composite material the protrusion in the bore can be formed as an integral part without the requirement of inserting a separate component.

BRIEF DESCRIPTION OF THE DRAWINGS

In the accompanying drawings which illustrate, by way of example only, various embodiments of the fastener and its components, FIG. 11 is an isometric view of the fastener wherein the protrusion in the socket is in the shape of a separate insert, FIG. 12 is an elevation of the bolt of the fastener of FIG. 11, FIG. 13 is a vertical section through the socket of FIG. 11, showing the insert in section, FIG. 14 is a plan view of the socket shown in FIG. 13, and FIG. 15 shows a modification of the socket of FIG. 11 and its mode of fastening to one of the bodies to be connected.

DESCRIPTION OF THE PREFERRED EMBODIMENTS

Figure 1:
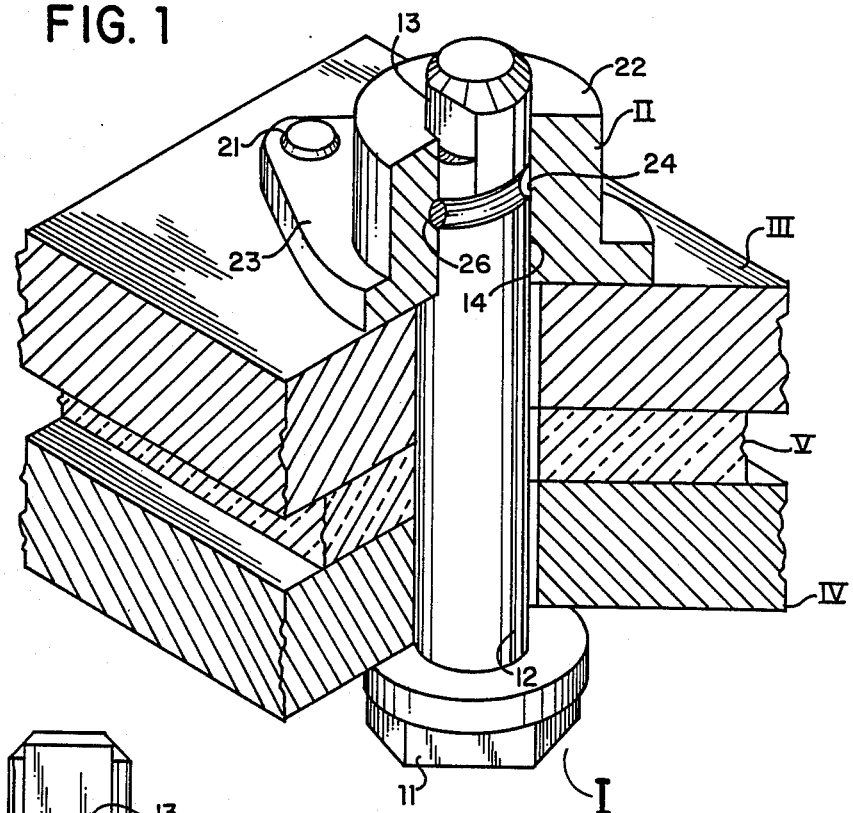
FIG. 1 is an isometric view of the fastener of the invention, showing the connection of two rigid plates and an interposed resilient gasket.
Figure 2:
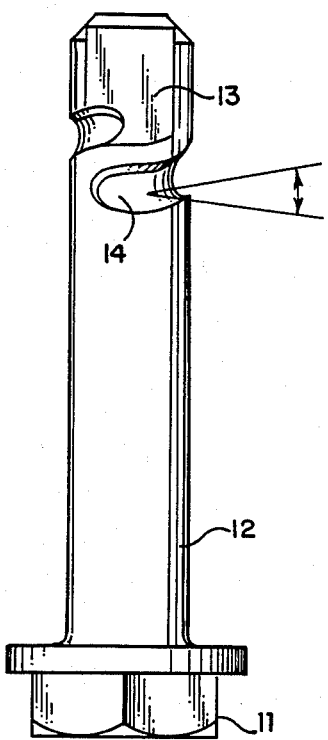
FIG. 2 is an elevation of the bolt of the fastener of FIG. 1.

Referring now to FIGS. 1 through 4 of the drawings, a fastener consists of a bolt I and a socket II which connect an upper rigid plate III with a lower rigid plate IV, a resilient gasket V being interposed, generally for sealing the gap between the two rigid plates. It is understood that the plates III and IV represent flanges of a larger body, such as for instance a container, where the socket side may be accessible or not. The socket II is fastened to the upper surface of the plate III by means of rivets or screws 21. The socket consists of a cylindrical portion 22 which is enlarged at its lower end to form an oval flange 23 perforated by holes 25 intended for its fastening by screws or rivets. The socket contains a throughgoing bore 24 which is provided, in its upper portion, with a protrusion in the form of a transversely and eccentrically inserted pin 26, part of which protrudes into the bore 24.

The bolt I comprises a hexagonal head 11 and a straight shank 12 of uniform diameter, the diameter cooperating with the bore 24 of the socket. The end of the shank is provided with a recess 13 which extends parallel to the shank at a depth of not less than that of the protrusion 26 into the bore, and with a helical groove 14 which merges with the recess 13 at its upper end and winds around the shank at a lead angle of not more than 10 degrees. The width and depth of the groove are slightly larger than the protrusion into the bore formed by the pin 26, permitting rotary motion of the bolt, while the protrusion 26 moves along the groove 14 until the resulting counter-torque prevents further turning of the bolt.

Figure 5:
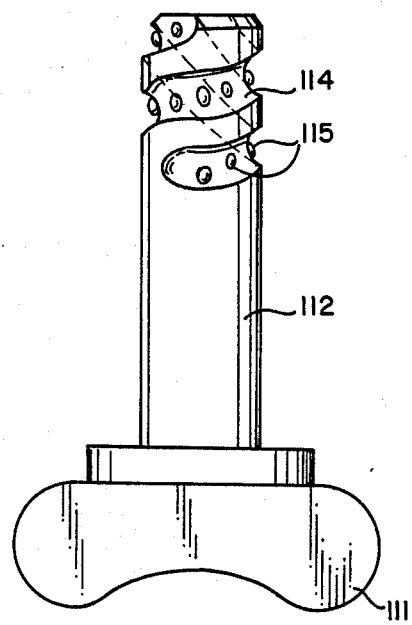
FIG. 5 is an elevation of a modified bolt of the fastener.

FIG. 5 illustrates a modification of the bolt I wherein a two-thread helical groove 114 starts right from the far end of the shank 112, and extends for about one third of the shank's length. The ground of the groove is provided with centrally located, spaced-apart knobs 115 which serve to increase the friction of the protrusion 26 with these knobs and thus to prevent slipping of the bolt out of the socket. It will be understood that the height of the knobs is such that they just contact the protrusion 26 while passing along and over it, resulting in a step-like progress of the bolt rotation, and in positive locking. The groove and the knobs are preferably produced by cold forming between rollers of suitable configuration or by hot forming in a die.

The head 111 is in the shape of a wing or butterfly permitting turning of the bolt by finger action without the aid of a special tool.

Figure 3:
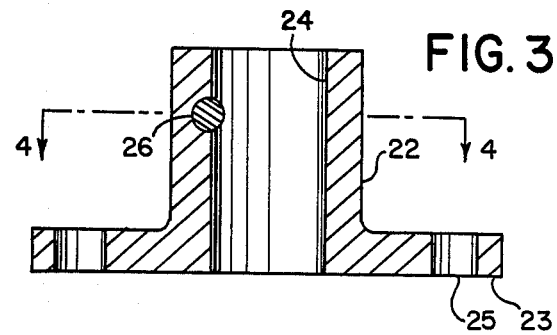
FIG. 3 is a section through the socket of the fastener of FIG. 1.
Figure 4:
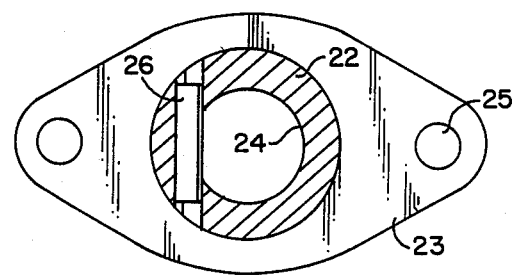
FIG. 4 is a section along the line 4—4 of FIG. 3.
Figure 6:
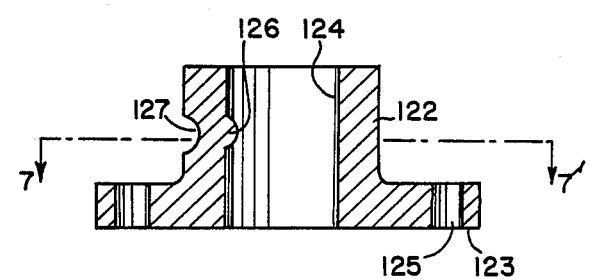
FIG. 6 is a section through a modification of the socket.
Figure 7:
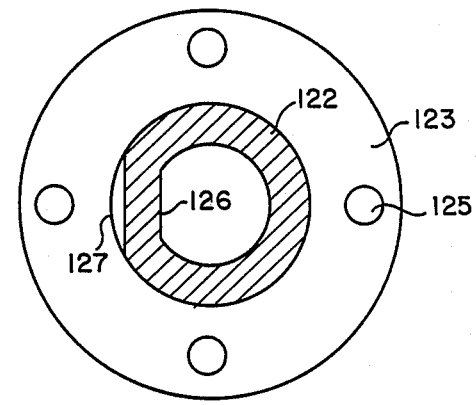
FIG. 7 is a section along the line 7—7 of FIG. 6.

FIGS. 6 and 7 illustrate a modification of the socket II. Herein a protrusion 126 is formed by pressure from the outside of the cylindrical portion by means of an oblong tool, against a grooved die positioned in the bore 124 during the forming process, resulting in a transverse groove 127 on the outside of the cylindrical portion 122. The resulting protrusion 126 is similar to that obtained by driving a pin (26) through the cylindrical portion as illustrated in FIGS. 1, 3 and 4. The other modification shown in this figure expresses itself in the shape of the flange 123 which is circular and perforated by four holes 125.

Figure 10:
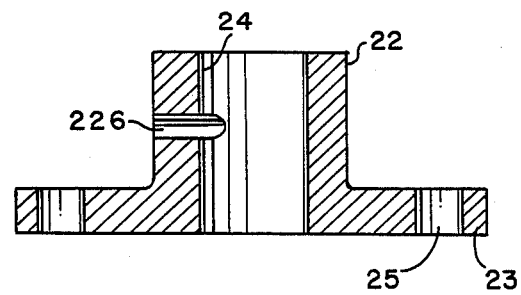
FIG. 10 is a section through a socket provided with a protrusion in the shape of a radially inserted pin.

FIG. 10 illustrates another mechanical way of producing the protrusion by positioning in the cylindrical portion 22 a pin 226 in radial direction, its inner portion protruding into the bore 24 by a length dictated by the depth of the respective helical groove in the bolt.

Figure 8:
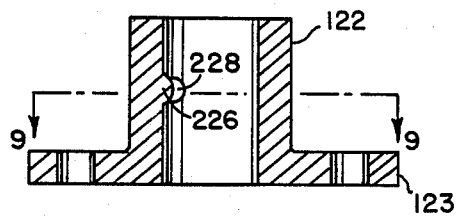
FIG. 8 is a section through a socket made of a composite or a sintered material.
Figure 9:
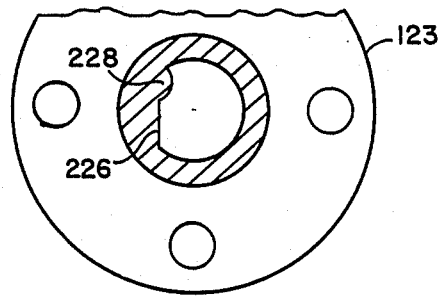
FIG. 9 is a section along the line 9—9 of FIG. 8.

FIGS. 8 and 9 illustrate a socket manufactured in a die from a sintered metal or a reinforced synthetic resin. Herein the cylindrical portion 122 and the flange 123 are identical with these of the socket illustrated in FIGS. 6 and 7, only differing in the shape and nature of the protrusion 226 which is provided with a bulbous knob 228 at the end of the semi-cylindrical protrusion 226. As mentioned at the beginning of this paragraph, the socket is produced in a die which is necessarily provided with a divided core so as to be readily extracted from the bore.

The fastener illustrated in FIGS. 11, 12, 13 and 14 differs from the foregoing in the manner of providing the protrusion in the socket. Since there exist certain difficulties in manufacturing the socket as illustrated in FIGS. 8 and 9 from a sintered metal or a reinforced synthetic resin in a die, the socket illustrated in these figures is assembled from two, initially separate, parts. For this purpose the socket is recessed by a recess 40 in the shape of a dovetail which extends from the bore in lateral direction and from the top downwards to a short distance from the bottom of the socket. An insert 41 of the same or similar material and of trapezoidal cross section is tightly fitted into this recess, and contains the protrusion 42 which is inclined at the same angle as the helical groove 14 in the shank of the bolt I. Since the pressure of the bolt in the socket is in downward direction, tightening of the bolt in the socket will not loosen the insert, to the contrary, it will draw it deeper into the socket. The actual diameter of the bore is defined by two longitudinal ribs 44 which protrude out of the bore surface and form two narrow contact surfaces with the bolt I. Owing to the small areas in contact the surface pressure is increased, creating a higher friction in the contact areas and assisting in preventing the bolt from being loosened in the socket bore, even in case of vibrations.

FIG. 15 illustrates a socket 2 provided with a collar 50 which replaces the flange 23 or 123 of the aforedescribed embodiments of the socket. The present socket is connected to the solid body which it is to connect, with the aid of a flange 51 provided with a recess 52 cooperating with the collar 50. This arrangement permits a certain angular freedom of the socket and easier insertion of the bolt from underneath. The collar and the recess are preferably of square or hexagonal configuration, preventing rotation of the socket in the flange. The protrusion 42 is manufactured in the same manner as that described in respect of the socket of FIG. 13.

It will be understood that the embodiments illustrated and described in the foregoing represent only some examples of the components of the fastener, and that variations and modifications may be carried out by a person skilled in the art, within the scope of the appended claims.

I claim:

1. A quick-action fastener to connect portions of two rigid bodies which are in parallel alignment, said rigid bodies being perforated by a through-going hole, the fastener comprising:

a socket perforated by a bore of a diameter not larger than said through-going hole, said bore being provided with an inwardly projecting protrusion, and said socket having means for rigidly fastening it to the outside of one of said rigid bodies substantially concentric with said through-going hole;

a bolt having a near end and a far end, comprising a shank of generally uniform diameter, which is smaller than said socket bore, said bolt being provided at its near end with a head permitting rotation of said shank in said bore, and being provided at its far end with a helical groove having a wall and a lead angle not exceeding about 15 degrees and a size permitting motion of said protrusion along said groove during rotation of said bolt, said groove extending around at least half the circumference of said shaft;

tensioning means for producing sufficient friction between said protrusion and the wall of said helical groove after rotation of said bolt to hold said bolt in position and to clamp the two rigid bodies together, said tensioning means comprising a generally flat resilient body inserted between the two rigid bodies, said resilient body having a thickness sufficient that it is compressed upon rotation of said bolt to produce said friction; and means for increasing friction between said bolt shank and said socket, comprising a plurality of rib members extending longitudinally along and projecting inwardly from said bore, said rib members forming longitudinal contact surfaces for the outer diameter of said shank.

2. The fastener of claim 1, wherein said helical groove extends only once around the circumference of said shaft.

3. The fastener of claim 1, wherein said helical groove extends twice around the circumference of said shaft.

4. The fastener of claim 1, wherein said socket is permanently attached to said rigid body.

5. The fastener of claim 1, wherein said socket comprises a cylindrical portion concentric with said bore and a flanged portion for fastening said socket to said rigid body.

6. The fastener of claim 5, wherein said protrusion in said bore of said socket comprises the surface of a cylindrical pin positioned in said cylindrical portion in transverse and eccentric alignment in relation to said bore.

7. The fastener of claim 5, wherein said protrusion in said bore of said socket comprises the inner end of a pin, radially positioned in said cylindrical portion and protruding into said bore.

8. The fastener of claim 5, wherein said protrusion in said bore of said socket comprises a bulge in the inner wall of said cylindrical portion.

9. The fastener of claim 5, wherein said protrusion in said bore of said socket comprises a member of trapezoidal shape inserted into a dovetail shaped recess formed in the inner wall of said cylindrical portion, such that a portion of said member extends into said bore.

10. The fastener of claim 1, wherein said head of said bolt has a hexagonal shape.

11. The fastener of claim 1, wherein said head of said bolt is winged.

12. The fastener of claim 1, wherein said head of said bolt contains a recess for the insertion of a tool.

13. The fastener of claim 1, wherein said bolt further comprises at its far end a longitudinal recess of a depth not less than said protrusion which is cut in such a way so as to allow insertion of the bolt into the socket in only one orientation, said helical groove beginning from the end of said recess.

14. The fastener of claim 1, wherein said resilient body comprises a generally planar body in parallel alignment with said two rigid bodies.

15. The fastener of claim 14, wherein said resilient body comprises a resilient gasket.

16. The fastener of claim 14, wherein said resilient body includes an aperture generally concentrically aligned with said through-going hole.

17. The fastener of claim 14, wherein said tensioning means consists essentially of only said resilient body.

18. A combination comprising a quick-action fastener connecting portions of two rigid bodies which are in parallel alignment, said rigid bodies being perforated by a through-going hole, and a generally flat resilient body interposed between said rigid bodies, said resilient body being perforated by a through-going hole aligned with the through-going hole of said rigid bodies, the quick-action fastener comprising:

a socket provided with means for rigidly fastening it to the outside of one of said rigid bodies, said socket being perforated by a bore of a diameter not larger than said through-going hole, said bore being provided with an inwardly projecting protrusion;

a bolt having a near end and a far end, comprising a shank of generally uniform diameter, which is smaller than said socket bore, said bolt being provided at its near end with a head permitting rotation of said shank in said bore, and being provided at its far end with a helical groove having a wall and a lead angle not exceeding about 15 degrees and a size permitting motion of said protrusion along said groove during rotation of said bolt, said groove extending around at least half the circumference of said shaft, said helical groove in said bolt extending to a point along said shaft sufficient to cause compression of said resilient material upon tightening the bolt to an extent that said protrusion comes substantially to said point of said groove, whereby frictional connection of said protrusion in said groove is maintained by said compression of said resilient material; and means for increasing friction between said bolt shank and said socket, comprising a plurality of rib members extending longitudinally along and projecting inwardly from said bore, said rib members forming longitudinal contact surfaces for the outer diameter of said shank.

19. The combination of claim 18, wherein said bolt further comprises at its far end a longitudinal recess of a depth not less than said protrusion which is cut in such a way so as to allow insertion of the bolt into the socket in only one orientation, said helical groove beginning from the end of said recess.

20. A quick-action fastener to connect portions of two rigid bodies which are in parallel alignment, said rigid bodies being perforated by a through-going hole, the fastener comprising:

a socket perforated by a bore of a diameter not larger than said through-going hole, said bore being provided with an inwardly projecting protrusion, and said socket having means for rigidly fastening it to the outside of one of said rigid bodies substantially concentric with said through-going hole;

a bolt having a near end and a far end, comprising a shank of generally uniform diameter, which is smaller than said socket bore, said bolt being provided at its near end with a head permitting rotation of said shank in said bore, and being provided at its far end with a helical groove having a wall and a lead angle not exceeding about 15 degrees and a size permitting motion of said protrusion along said groove during rotation of said bolt, said groove extending around at least half the circumference of said shaft; and tensioning means for producing sufficient friction between said protrusion and the wall of said helical groove after rotation of said bolt to hold said bolt in position and to clamp the two rigid bodies together, said tensioning means comprising a generally flat resilient body inserted between the two rigid bodies, said resilient body having a thickness sufficient that it is compressed upon rotation of said bolt to produce said friction, wherein said helical groove in said bolt is provided with upstanding, spaced-apart knobs positioned on and along the bottom of said groove, said knobs projecting as far as to just make contact with the said protrusion in said bore of said socket while said bolt is rotated in said socket.

* * * * *